Patented Aug. 6, 1935

2,010,615

UNITED STATES PATENT OFFICE 2,010,615

PRODUCTION OF ANHYDROUS ALKALI METAL HYPOSULPHITES

Byron M. Vanderbilt and Howard Adler, Chicago Heights, Ill., assignors to Victor Chemical Works, a corporation of Illinois No Drawing. Application July 31, 1933, Serial No. 683,096

15 Claims. (Cl. 23—116)

This invention relates to the production of anhydrous alkali metal hyposulphites.

It has heretofore been proposed to carry out the production of anhydrous alkali metal hyposulphites in strong ethyl alcohol, by the interaction of sodium or other alkali metal sulphite compounds and alkali formates. Such a method, however, affords a product of relatively low stability and purity, and requires an alcohol containing relatively little water.

By means of the present invention, anhydrous alkali metal hyposulphites of high purity and stability are produced, and at the same time the method is more readily carried out because a larger proportion of water is permissible. The use of the more dilute solvent greatly facilitates the formation of the hyposulphite. Likewise it is possible to use more impure formate than previously, while still obtaining a better purity in the final product.

In accordance with the present invention, it is preferred to use as starting materials an alkali metal compound of the class consisting of hydroxides and carbonates, an alkali metal formate and sulphur dioxide. It has been discovered that with these starting materials the difficulties due to the presence of impurities in alkali metal bisulphites and pyrosulphites are overcome, since there is no opportunity for the oxidation of any sulphites formed intermediately.

The use of an alkali metal carbonate is preferred over the use of caustic alkali because the reaction of the sulphur dioxide liberates carbon dioxide, which acts to sweep out of the mixture any oxidizing gases which may be present, thereby preventing partial oxidation of the hyposulphite.

It is likewise preferred, instead of using an ethyl alcohol solution in accordance with the prior art, to use a solution containing methyl alcohol, either in combination with ethyl alcohol or alone. For example, in using ethyl alcohol alone it was found that the presence of more than 21% by weight of water caused coagulation and partial decomposition of the hyposulphite as it was formed, and resulted in an unstable sticky solid mass. By replacing part or all of the ethyl alcohol by methanol it is possible to use a considerably more dilute solution without this decomposition, and at the same time produce a compound of higher purity and greater stability with solutions above the critical point.

It has likewise been discovered that by adding sulphur dioxide to the mixture at a temperature below 30° C. the final product is of larger particle size and more stable than when the sulphur dioxide is added at higher temperatures. Further, the addition of the sulphur dioxide at any temperature below that necessary for the formation of the hyposulphite, permits the introduction of the full amount of this reagent required before any reaction to form hyposulphite takes place. In this way, it is possible to use sulphur dioxide directly from the combustion of sulphur, without the necessity of removing excess oxygen from the combustion gases, since no appreciable amount of this oxygen is retained in the solution. This permits the use of an exceedingly cheap method of making the sulphur dioxide for the process.

It is also advisable to introduce the sulphur dioxide into an alcohol solution of the reagents rather than into an aqueous solution to which the alcohol is subsequently added.

The hyposulphite is only one of a large number of compounds which may be formed from these ingredients. In order to obtain high yields and a pure product, it is therefore necessary to control carefully the reaction conditions. It is preferred, after introducing all of the sulphur dioxide, to heat the mixture rapidly to a temperature between 50 and 60° C., at which point the hyposulphite formation begins. Thereafter the temperature is gradually raised for about one hour to 70–76° C., and is maintained at this point for about 4 to 5 hours. Overheating should be avoided, since this will cause decomposition of the hyposulphite. Decomposition is indicated by coagulation of the precipitate.

It was further discovered that the purity and the stability of the hyposulphite product can be increased by washing the precipitate with methanol rather than anhydrous ethyl alcohol. This is believed to be due to the fact that most of the impurities, such as sodium thiosulphate, sodium formate, etc., are more soluble in methanol than in ethyl alcohol. The methanol is also more easily dried out of the product and can be more readily recovered for re-use.

The drying of the product should be carefully controlled. It is preferred to dry at room temperatures under a high vacuum (less than 20 mm. of mercury) until the product becomes dusty, after which the temperature is increased to a point below 125° C., and preferably around 100° C. until the product is completely dry and free of methanol. By following this procedure, the product will be free from obnoxious organic odors and will show a minimum tendency to cake in storage.

The reaction conditions and procedure are somewhat different where a methyl alcohol and ethyl alcohol mixture is used from those where methyl alcohol alone is employed.

As an example of the use of both alcohols, 430 ccs. of dilute ethyl-methyl alcohol solution, of approximately 71-72% strength by weight, and containing methyl alcohol to the extent of 10-20% (preferably about 15%) of the weight of the ethyl alcohol, is placed in a 500 cc. three-neck flask equipped with a sealed stirrer and a reflux condenser. To this are added 63.2 gms. of sodium formate (100% equivalent) and 12 gms. of soda ash, and then 48.5 gms. of gaseous sulfur dioxide are introduced slowly while agitating well, and while maintaining a temperature below 30° C. After the addition of the sulphur dioxide is complete, the temperature is raised at once to 50-60° C., preferably about 56° C., and the mixture is then slowly heated from this point up to 65-75° C. (preferably about 70° C.) over a period of one hour. This temperature is maintained for approximately two hours and is then raised to 72° C. for about one hour, and then to 74° C. for about 1½ hours. At this point the reaction reaches an equilibrium. The mixture is then cooled to below 50° C. and the precipitated sodium hyposulphite collected in a vacuum filter, while maintaining at all times a non-oxidizing atmosphere. It is preferred that this atmosphere be carbon dioxide, particularly since carbon dioxide is a by-product of the process. The filtered hyposulphite is then washed with an oxygen-free, 75-85% methanol solution at room temperature, to remove soluble salts present in the adhering mother liquor. It is then washed water-free with methanol, and dried under a high vacuum, preferably below 20 mm. of mercury, at room temperatures, until the product appears dusty. The temperature is then raised to not over 125° C. (preferably about 100° C.) and is maintained at this point for about one hour, or until all of the adhering methanol has been removed. The product resulting from this process is a snow-white, slightly granular material containing over 91% anhydrous sodium hyposulphite ($Na_2S_2O_4$).

As an example of the use of methanol solution alone, 356 grams of dilute methanol solution, containing less than 75% methyl alcohol (preferably 68-69% by weight) is placed in a 500 cc. three-neck flask equipped as in the previous example, but arranged to operate at super-atmospheric pressure. 63.2 grams of sodium formate (100% equivalent) and 16 grams of soda ash are added, followed by 48.5 grams of gaseous sulphur dioxide, which is introduced while thoroughly agitated, and while maintaining a temperature below 30° C. The sulphur dioxide should be added with care. After approximately half of the gas has been added, the mixture becomes a clear solution. On further addition of the sulphur dioxide a coarse precipitate forms. This complete solution effect and subsequent precipitation does not occur where the ethyl alcohol is used or where the ethyl-methyl alcohol mixture is used. It is believed to be the cause of the larger particle sizes. If the sulphur dioxide is added too rapidly or at too high a temperature, this effect is not obtained and the product is very finely divided. It is probable that complex intermediate products of methanol are formed at this stage, but their nature is not at present known. After the addition of the sulphur dioxide is complete, the temperature is raised at once to not over 58° C. (preferably to about 52° C.), and the mixture is then heated slowly to approximately 70° C. over a period of one hour. The temperature is then maintained between 70 and 76° C. for 3½ hours to 5 hours, or until the formation of the hyposulphite is complete. During the reaction a super-atmospheric pressure of at least one atmosphere should be maintained. The product may be filtered, washed and dried under the conditions previously specified. The product resulting is a snow-white, coarse granular material containing over 92% anhydrous sodium hyposulphite.

The foregoing detailed description has been given for clearness of understanding only, and no unnecessary limitations should be understood therefrom, but the appended claims should be construed as broadly as permissible, in view of the prior art.

What we regard as new, and desire to secure by Letters Patent, is:

1. The method of preparing an anhydrous alkali metal hyposulphite which comprises reacting an alkali metal formate, sulphur dioxide and an alkali metal compound capable of forming a pyrosulphite or bisulphite with sulphur dioxide, in an aqueous solution containing a substantial quantity of methyl alcohol.

2. The method as set forth in claim 1, in which said solution consists mainly of methyl and ethyl alcohol.

3. The method as set forth in claim 1, in which said solution consists mainly of methyl alcohol.

4. The method as set forth in claim 1, in which said solution contains 70-80% of a mixture of ethyl and methyl alcohols based upon the total alcohol and water content.

5. The method as set forth in claim 1, in which said solution contains 70-80% alcohol based upon the alcohol and water content, 10-20% of the alcohol being methyl alcohol and 80-90% being ethyl alcohol.

6. The method of preparing an anhydrous alkali metal hyposulphite which comprises reacting an alkali metal formate, sulphur dioxide, and an alkali metal compound of the class consisting of hydroxides and carbonates in an aqueous ethyl alcohol solution containing a substantial quantity of methyl alcohol.

7. The method as set forth in claim 6, in which said sulphur dioxide is introduced into the mixture at a temperature below that necessary to form alkali metal hyposulpite.

8. The method as set forth in claim 6, in which said sulphur dioxide is introduced at a temperature below 30° C.

9. The method as set forth in claim 6, in which said sulphur dioxide is introduced while said mixture is at a temperature below 30° C.; said mixture is heated rapidly to 50-60° C., is then slowly heated to 65-75° C., and is maintained at this temperature until the formation of hyposulphite is substantially complete.

10. The method as set forth in claim 6, in which said sulphur dioxide is introduced below 30° C., the reaction mixture is heated rapidly to about 56° C., is then slowly heated to about 70° C., where it is maintained for about two hours, then to about 72° C. for one hour, and finally to about 74° C. until the formation of hyposulphite is substantially complete.

11. The method as set forth in claim 6, in which the reaction products are filtered, washed with methanol and then dried under high vacuum at room temperature until the product is dusty in appearance, and then dried at a temperature below 125° C. until the methanol is completely removed.

12. The method of preparing an anhydrous alkali metal hyposulphite which comprises reacting an alkali metal formate, sulphur dioxide, and an alkali metal compound of the class consisting of hydroxides and carbonates, in an aqueous solution of methyl alcohol, said reaction being carried out at a super-atmospheric pressure of the order of one atmosphere.

13. The method as set forth in claim 12, in which the sulphur dioxide is introduced at a temperature below 30° C.

14. The method as set forth in claim 12, in which the sulphur dioxide is introduced at a temperature below 30° C., and the reaction mixture is then heated quickly to 50–55° C. and then is slowly heated to 65–76° C., and is maintained at this temperature until the hyposulphite formation is substantially complete.

15. The method of preparing an anhydrous alkali metal hyposulphite which comprises reacting an alkali metal formate, sulphur dioxide and an alkali metal compound capable of forming a pyrosulphite or bisulphite with sulphur dioxide, in a solution of methyl and ethyl alcohol containing a substantial quantity of water.

BYRON M. VANDERBILT.
HOWARD ADLER.